United States Patent
Faenger et al.

(10) Patent No.: US 8,265,865 B2
(45) Date of Patent: Sep. 11, 2012

(54) METHOD FOR VISUALIZING GEOGRAPHIC DATA

(75) Inventors: Jens Faenger, Palo Alto, CA (US); Andreas Kynast, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 712 days.

(21) Appl. No.: 12/227,617

(22) PCT Filed: May 10, 2007

(86) PCT No.: PCT/EP2007/054518
§ 371 (c)(1),
(2), (4) Date: Jul. 30, 2009

(87) PCT Pub. No.: WO2007/147682
PCT Pub. Date: Dec. 27, 2007

(65) Prior Publication Data
US 2009/0306883 A1    Dec. 10, 2009

(30) Foreign Application Priority Data
Jun. 19, 2006   (DE) .................. 10 2006 028 010

(51) Int. Cl.
*G06F 7/00* (2006.01)

(52) U.S. Cl. .............. 701/409; 701/450; 701/454
(58) Field of Classification Search .......... 701/200–213, 701/408, 409, 415, 431, 450, 454, 468; 345/581–589
See application file for complete search history.

(56) References Cited

U.S. PATENT DOCUMENTS
7,570,261 B1 *   8/2009   Edecker et al. ............... 345/420

FOREIGN PATENT DOCUMENTS

| | | |
|---|---|---|
| DE | 103 36 581 | 4/2004 |
| EP | 1 054 354 | 11/2000 |
| EP | 1 189 176 | 3/2002 |
| EP | 1 508 780 | 2/2005 |
| EP | 1 626 250 | 2/2006 |
| JP | 10 221093 | 8/1998 |
| JP | 10 267668 | 10/1998 |
| JP | 2002 131064 | 5/2002 |
| JP | 2003-114130 | 4/2003 |
| JP | 2005-338748 | 12/2005 |
| WO | WO 99/57521 | 11/1999 |

* cited by examiner

*Primary Examiner* — Richard M. Camby
(74) *Attorney, Agent, or Firm* — Kenyon & Kenyon LLP

(57) ABSTRACT

In a method for visualizing geographic data using at least two-dimensional objects, at least one surface of the objects is covered with at least one texture, which texture is dynamically assigned to the at least one surface of the objects as a function of at least one input factor.

17 Claims, 3 Drawing Sheets

METHOD FOR VISUALIZING GEOGRAPHIC DATA

BACKGROUND OF THE INVENTION

1. Field of the Invention

The present invention relates to a method and a device for visualizing geographic data using at least two-dimensional objects, at least one surface of the objects being covered with at least one texture.

2. Description of Related Art

Published European patent document EP 1 508 780 describes a navigation device for guiding a vehicle in which objects bordering the travel route are prominently displayed on a display device compared to the rest of the objects in the vehicle surroundings. In this way, objects in the immediate proximity of the travel route, which are important for the driver's navigation, may be displayed prominently in order to facilitate the driver's orientation. The prominence may be achieved by changing colors and/or contrasts.

It is customary that the objects bordering the travel route are displayed three-dimensionally, the travel route being viewed from a bird's eye perspective. The display of the objects is standardized, i.e., the objects are always displayed alike irrespective of external factors, e.g., the time of year, the weather, or the visibility conditions. The disadvantage here is that the surroundings displayed on the navigation device may differ considerably from the real surroundings, which makes the driver's orientation difficult. For example, the real surroundings are white in the winter and the trees are without leaves, while the display of the navigation device shows sunshine and trees having green leaves. Such serious differences may result in a considerable orientation loss for the driver.

BRIEF SUMMARY OF THE INVENTION

Therefore, it is an object of the present invention to provide an improved method for displaying geographic data using at least two-dimensional objects.

The object of the present invention is achieved by the method of the type indicated at the outset by dynamically assigning at least one of the textures to at least one of the surfaces of the objects as a function of at least one input factor.

It is advantageous when the time of year, the date, and the time of day are incorporated as input factors in the display of the objects. For example, in winter snow-covered trees may be displayed, while in summer the trees may be displayed having magnificent green leaves. The display of the objects may change between a day view and a night view as a function of the time of day.

Moreover, it is particularly advantageous when the parameters of the weather and/or the visibility conditions are taken into account in the assignment of the textures to the individual objects. The condition of the atmosphere at a certain point in time at a certain location is referred to as weather. For example, atmospheric conditions such as sunshine, cloudiness, rain, wind, heat, or cold may considerably change the display of the objects.

It is particularly advantageous when the textures for the objects are displayed as a function of a geographic position. For example, the textures may be selected based on country-specific factors. But it is also conceivable that the selection of the textures is not only country-dependent, but that regional characteristics are also taken into account. For example, buildings in different regions of Germany may be displayed differently. It is also conceivable that the display of the objects is adapted to the urban area and the countryside. Objects in a big city are certainly displayed differently than corresponding objects in the proximity of a village.

The textures are dynamically assigned to the objects. In the event of a change in the influencing factors, on which the instantaneous assignment of the textures is dependent, new textures are assigned to the objects, if needed, as a function of the changed influencing factors. It is particularly advantageous when the textures are adapted to the new influencing factors only when the changes have been present for a specified minimum period. This is particularly meaningful when the changes of the influencing factors are only short-term and affect the overall situation only slightly.

It is also particularly advantageous when, in addition to the above-mentioned influencing factors, the textures are selected as a function of a color scheme of a passenger compartment of a vehicle. This makes it possible to adapt the display of the objects to the design of a space.

Furthermore, the present invention relates to a navigation device having a display device and a control device for carrying out the above-described method. It is advantageous when the navigation device is set up for detecting the weather and/or the visibility conditions. For example, this may be done by connecting the navigation device to sensors situated in a vehicle. It is also advantageous when the control device for selecting the textures is set up as a function of the graphical user interface set on the navigation device. This makes it possible to adapt the textures in such a way that a pleasing overall picture is created.

DETAILED DESCRIPTION OF THE INVENTION

Figure 1:
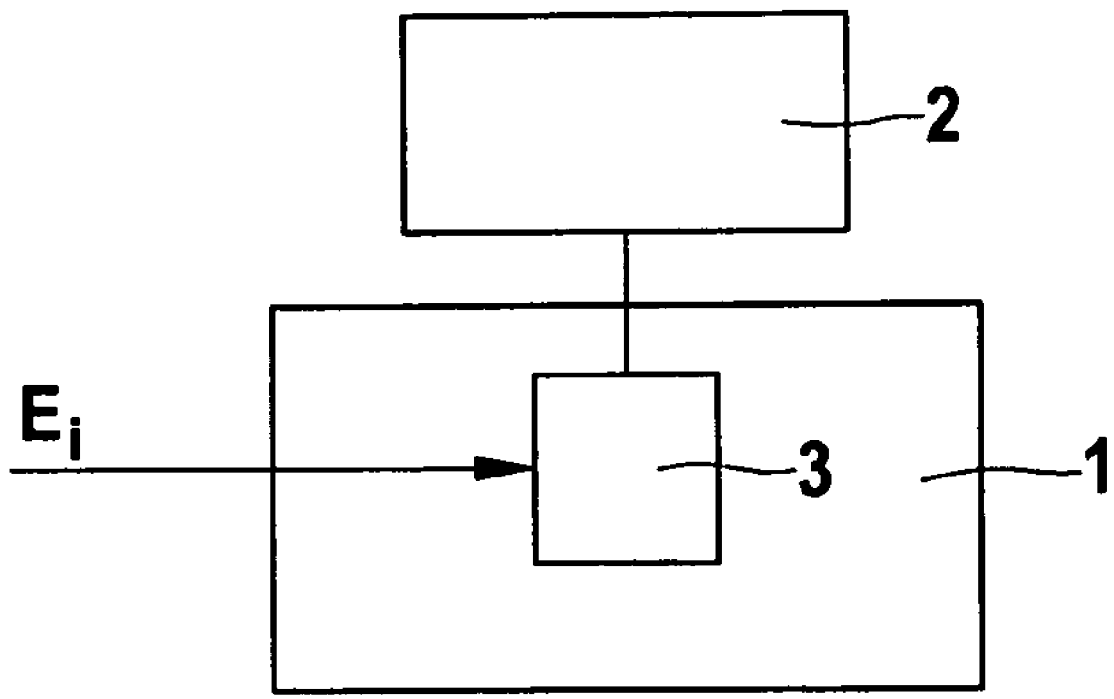
FIG. 1 shows a schematic representation of a navigation device having a display device and a control device.

FIG. 1 shows a block diagram of a navigation device 1 having a display device 2. Navigation device 1 has a control device 3 for routing and for controlling display device 2. Two- and three-dimensional objects displayed on display device 2 are processed by control device 3 in such a way that surfaces of the objects are dynamically covered with textures as a function of input factors $E_i$ (where i=O through N and N=the number of input factors taken into account) supplied by control device 3. The design of the textures depends on the at least one input factor $E_i$.

Figure 2A:
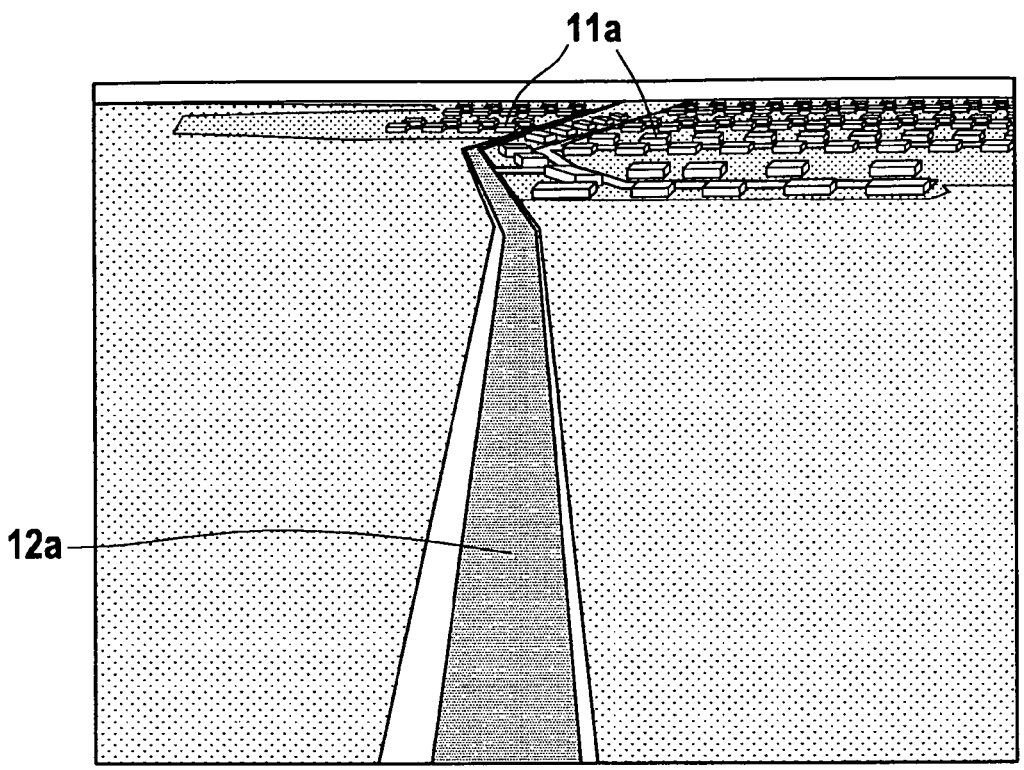
FIG. 2a shows a representation of fields as a function of the summer season.
Figure 2B:
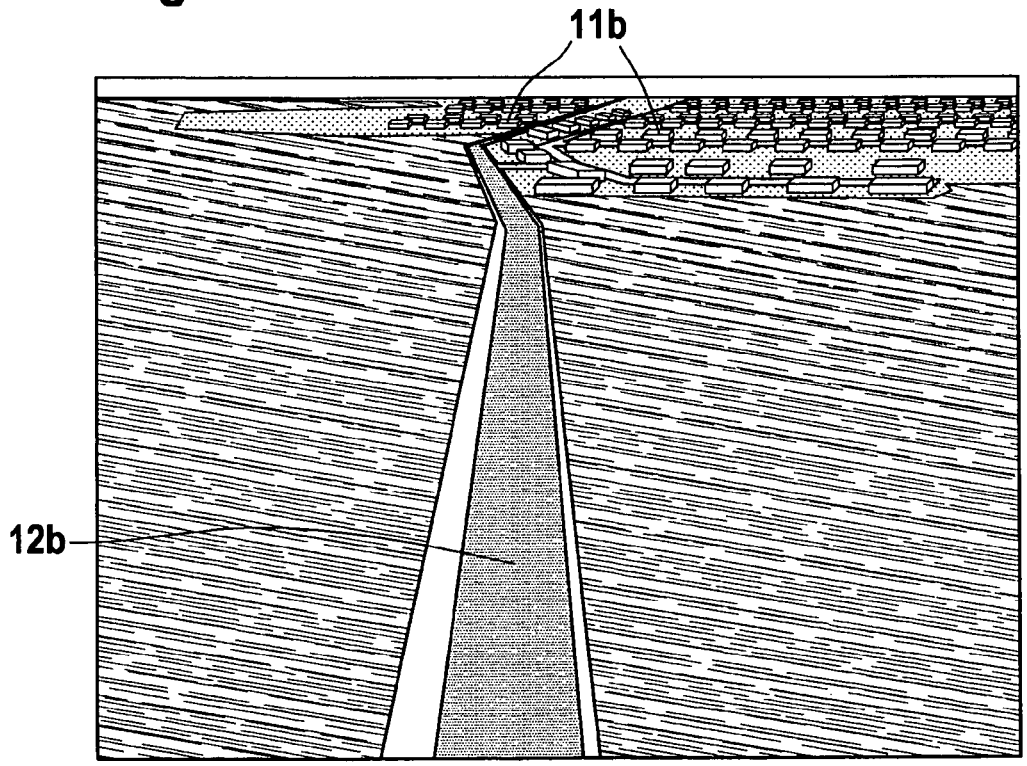
FIG. 2b shows a representation of fields as a function of the fall season.

FIGS. 2a and 2b show a representation of fields 11a and 11b, respectively, the way they are displayed in a navigation device, for example. In FIG. 2a, the textures for representing fields 11a have been selected as a function of the summer season. Since the fields are green in the summer, due to the growing crops, it must be taken into account in the representation in a navigation device. Therefore, the textures for representing fields 11a have been selected in such a way that they are as similar as possible to real fields in the summer.

In contrast, the same section of the countryside is apparent in FIG. 2b; however, this representation is selected as a function of the fall season. Since the fields are normally plowed in the fall, the representation of such a field must be appropriately adapted to the season in a navigation device or other device. In this way, a realistic representation of the surroundings may be displayed to the user in order to simplify the orientation.

Moreover, it would be conceivable, for example, that the fields are snow-covered in the winter. However, since there is not necessarily snow on the ground in the winter, it is advantageous, for example, when snow-covered fields are only displayed in the winter when the appropriate sensors detect a longer-lasting snowfall. Furthermore, it is also conceivable to display the representation of the fields as a function of the current position of the vehicle. For example, fields in the summer in the Netherlands may be shown as large flower fields or tulip fields, while they are shown in Germany as grain fields or rape fields. Representations as a function of different regions within one country are also conceivable. For example, fields in the south of France have a typical appearance characterized by wine, while in the north of France a totally different picture characterizes the fields.

It is particularly advantageous, for example, when, using the current position, a conclusion may be drawn on the elevation of the navigation device in order to display the vegetation as a function of the elevation. For example, trees at a high elevation are rather small, while tall vegetation grows in the flatland. This may be taken into account using appropriate textures in the assignment to the objects.

Figure 3A:
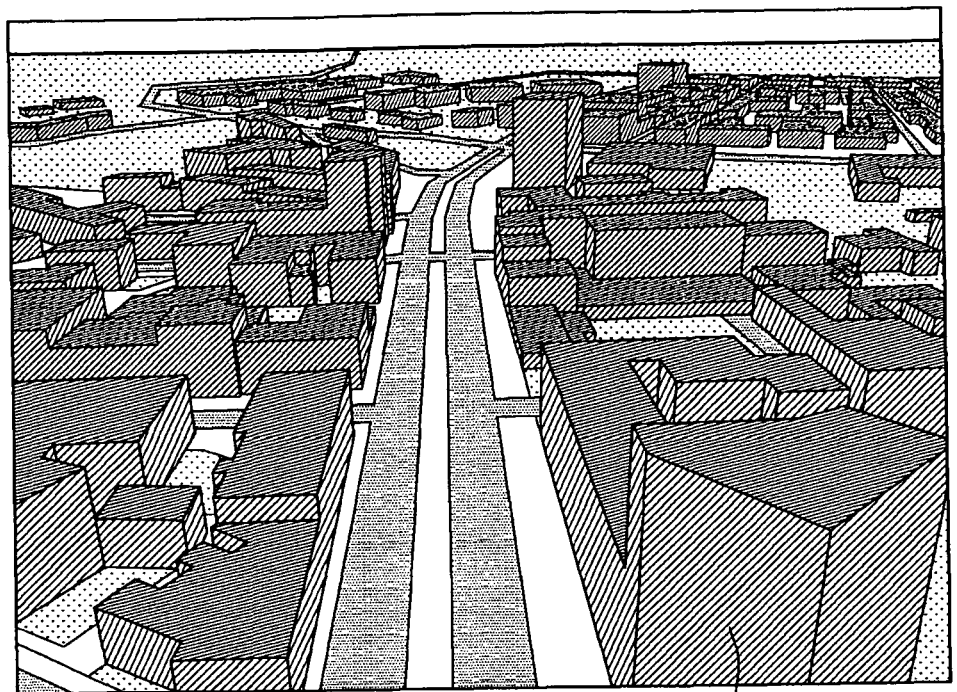
FIG. 3a shows a representation of objects as buildings in an example country.
Figure 3B:
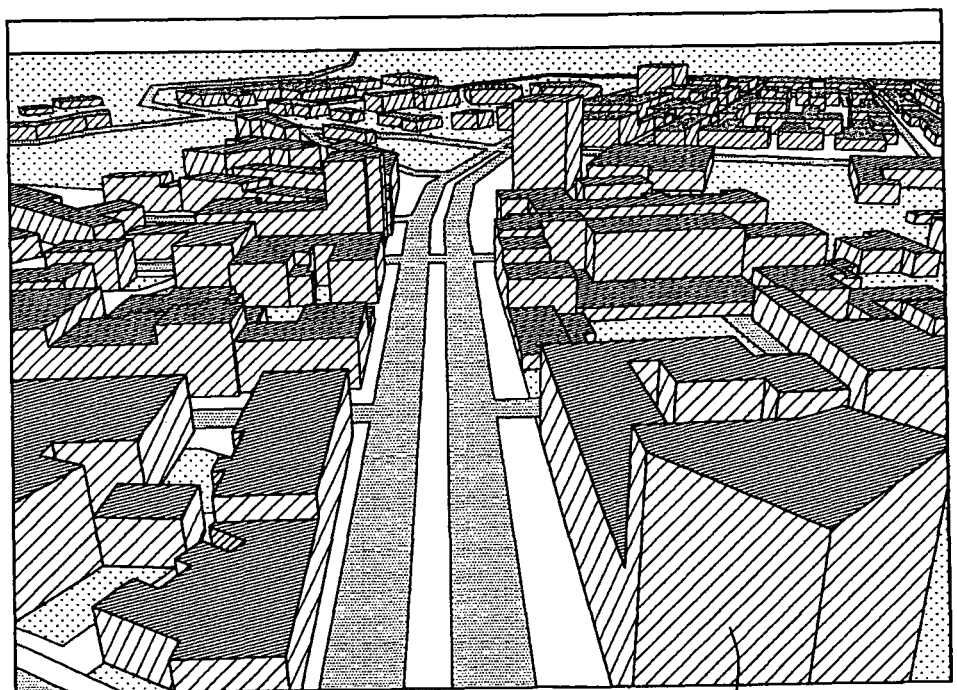
FIG. 3b shows a representation of objects as buildings in another example country.

FIGS. 3a and 3b each show a section of a city district where the textures of the objects have been selected as a function of a country. Therefore, it is apparent in FIG. 3a that the white color has been selected for the textures of building fronts 21a, thereby characterizing the cityscape by uniform building fronts for display in a navigation device. FIG. 3b shows the same city section; here, however, colored textures have been used for the building fronts. The user thus obtains different representations of the city centers in different countries. However, it would also be conceivable that the buildings are displayed according to regional situations. For example, houses having thatched roofs are displayed in one region, while in other regions half-timbered houses are rather to be found, whereby a substantially more accurate image of the surroundings is achieved.

What is claimed is:

1. A method for visualizing geographic data, comprising:
    displaying a plurality of objects that each has at least two dimensions; and
    for each of at least one of the plurality of objects, covering at least one surface of the respective object with at least one texture, wherein the at least one texture is dynamically assigned to the at least one surface as a function of at least one input factor, the at least one texture being independent of textures of others of the plurality of objects.

2. The method as recited in claim 1, wherein the object has three dimensions.

3. The method as recited in claim 1, wherein the at least one input factor includes at least one of the time of year, the date and the time of day.

4. The method as recited in claim 1, wherein the at least one input factor includes at least one of a weather parameter and visibility condition.

5. The method as recited in claim 1, wherein the at least one input factor includes a geographic position.

6. The method as recited in claim 1, wherein a different texture is assigned to the at least one surface when the at least one input factor changes.

7. The method as recited in claim 6, wherein the different texture is assigned only after a time delay, and wherein a change of the at least one input factor is present during the entire duration of the time delay.

8. The method as recited in claim 1, wherein the at least one input factor is at least one of a color scheme and déecor of an interior of the passenger compartment of a vehicle.

9. A navigation device, comprising:
    a display device configured to display a plurality of objects that each has at least two dimensions; and
    a control device configured to, for each of at least one of the plurality of objects, cover at least one surface of the respective object with at least one texture, wherein the at least one texture is dynamically assigned to the at least one surface as a function of at least one input factor, the at least one texture being independent of texture of others of the plurality of objects.

10. The navigation device as recited in claim 9, wherein the navigation device is configured to at least one of detect and receive at least one of weather information and visibility information.

11. The navigation device as recited in claim 9, wherein the control device is configured to dynamically adapt the at least one texture as a function of a graphical user interface of the display device.

12. The navigation device as recited in claim 9, wherein the respective object has three dimensions.

13. The navigation device as recited in claim 9, wherein the at least one input factor includes at least one of the time of year, the date and the time of day.

14. The navigation device as recited in claim 9, wherein the navigation device is configured to detect a geographic position.

15. The navigation device as recited in claim 9, wherein a different texture is assigned to the at least one surface when the at least one input factor changes.

16. The navigation device as recited in claim 15, wherein the different texture is assigned only after a time delay, and wherein a change of the at least one input factor is present during the entire duration of the time delay.

17. The navigation device as recited in claim 9, wherein the at least one input factor is at least one of a color scheme and déecor of an interior of the passenger compartment of a vehicle.

* * * * *